United States Patent [19]

Murray

[11] Patent Number: 4,655,316

[45] Date of Patent: Apr. 7, 1987

[54] ACOUSTIC DIAGPHRAGM

[75] Inventor: Fancher M. Murray, Thousand Oaks, Calif.

[73] Assignee: JBL Incorporated, Northridge, Calif.

[21] Appl. No.: 711,549

[22] Filed: Mar. 13, 1985

[51] Int. Cl.⁴ .............................................. G01K 13/00

[52] U.S. Cl. .................................... 181/164; 181/168; 181/173

[58] Field of Search ......... 181/164, 168, 157, 172–174

[56] References Cited

U.S. PATENT DOCUMENTS

| | | | |
|---|---|---|---|
| 1,056,475 | 3/1913 | Welser | 181/168 |
| 1,699,786 | 1/1929 | Goldsborough | 181/173 |
| 1,829,355 | 10/1931 | Houghton | 181/173 |
| 1,918,422 | 7/1933 | Nystrom | 181/168 |

*Primary Examiner*—Benjamin R. Fuller

*Attorney, Agent, or Firm*—Marks Murase & White

[57] ABSTRACT

An acoustic diaphragm is made of metallic sheet material forming a raised pattern of the material and unraised sectors of the material. The diaphragm is of the dome-shaped variety. The raised pattern incorporates sets of raised strip elements. There is a set of such elements extending radially from the vicinity of the apex. There is a set extending along areas of the sheet material between the radially extending elements, this second set including pairs of strip elements which intersect one another along such areas. There is also a set of circumferentially extending raised strip elements. The form of the radially extending elements changes along their lengths; for example, they rise to levels which vary along their lengths.

26 Claims, 5 Drawing Figures

FIG. 2
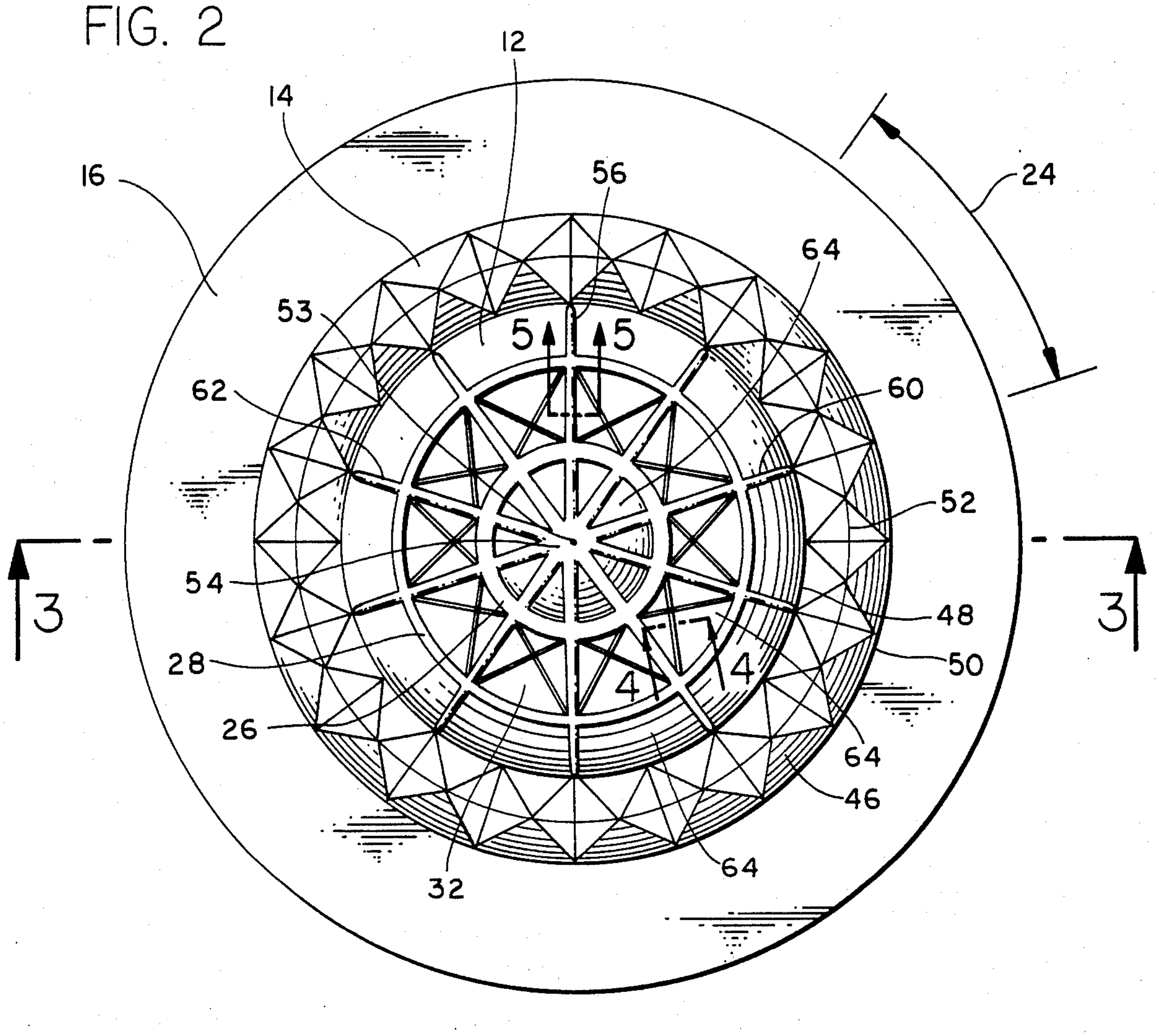
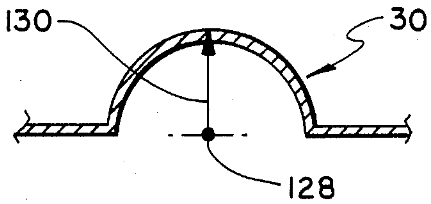
FIG. 4
FIG. 5
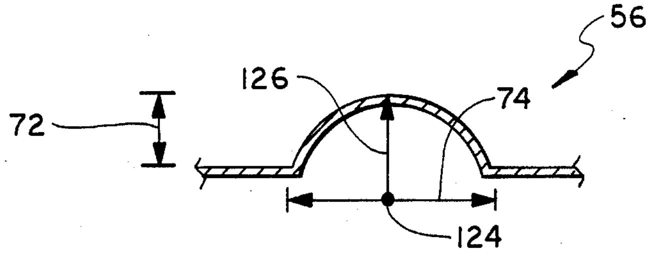

ACOUSTIC DIAPHRAGM

FIELD OF THE INVENTION

The invention pertains to the field of acoustic diaphragms.

BACKGROUND OF THE INVENTION

Acoustic diaphragms of soft material, such as paper or composites of a soft material and phenolic, have been most commonly adopted. The softness tends to damp out local area oscillations along the material which tend to have a negative effect on the frequency response of the diaphragm. Also, because of its softness, the material itself does not generate a sound as a result of the movement of its structure in connection with such local area oscillations.

The strength and stiffness requirements of diaphragms, and the relatively lesser degree of strength of paper or other soft materials, typically leads to relatively larger masses for diaphragms made of such materials. Since there generally is a mass-related frequency response roll-off at the upper frequency end for a diaphragm, this mass factor typically results in a roll-off in the frequency response at a significantly lower frequency than would otherwise be achieved.

For example, paper diaphragms which are used for frequencies from about 5 kilohertz to about 20 kilohertz (the upper part of the audio range for humans) typically have responses which roll-off significantly below the 20 kilohertz point.

Much effort has gone into attempting to improve various forms of paper or other soft diaphragms. Thus, relatively strong paper diaphragms of less than typical mass have been made. By way of example, in cone-shaped diaphragms of relatively large size, thus particularly adapted for the lower end of the audio spectrum, ridges have been provided to increase effectiveness. The usefulness and role of such in cone-shaped paper diaphragms having base diameters as small as about 12 inches (30.5 centimeters) has been significantly recognized.

Hard diaphragms of metallic material, for example having a dome shape, have been used to a generally lesser extent than soft diaphragms. Metal can typically provide more strength for the same mass than paper or other soft material. Thus, metallic material is advantageous with regard to roll-off at the high frequency end of a diaphragm's response.

However, metal diaphragms are recognized as presenting practical problems in formation for manufacturing purposes. For example, the thin metal tends to break during formation in a cold die, and such tendency can only be enhanced by complexity in the form of the structure. Formation in a hot die overcomes this, but does incorporate additional expense in constructing the hot die and also brings some negative safety considerations into the manufacturing process.

In addition, metallic diaphragms do not incorporate the damping out, by the material, of local area oscillations, as occurs for paper or other soft materials. The structural oscillations of the metal as a result of such local area oscillations, most particularly where the oscillations are resonances, also have a negative impact on the sound generated by metallic diaphragms. Specifically, "chirps" stemming from these relatively low level localized resonances, result from the hard, unyielding nature of the material, and interfere with the performance of such diaphragms, particularly in respect to people with acute hearing.

The present invention combines significant advantages typically associated with hard as well as soft material diaphragms. In so combining such advantages, it is most directly of concern with reference to diaphragms of relatively small and intermediate size.

SUMMARY OF THE INVENTION

In accordance with the invention, an acoustic diaphragm incorporates metallic sheet material forming a raised pattern of the material and unraised sectors of the material.

In accordance with other aspects of the invention, an acoustic diaphragm incorporates sheet material forming a raised pattern of the material and unraised sectors of the material, shaped to have base dimensions of less than or equal to approximately ten inches.

In an embodiment, in accordance with more detailed features of the invention, the sheet material has substantially a dome shape and the raised pattern of such material incorporates sets of raised strip elements.

One set is a set of strip elements extending radially from the vicinity of the apex of the sheet material. There is then a second set of raised strip elements extending along areas of the sheet material between the strip elements of the first set. This second set of strip elements includes pairs which intersect one another along such areas. There is also a third set of raised circumferentially extending strip elements which intersect the radially extending strip elements.

The radially extending raised strip elements of the first set have rise levels which are substantially defined by an imaginary envelope having the shape of a section of a spherical surface. Relating to this, the unraised sheet material sectors lie substantially along an imaginary spherical envelope surface having a different center than for the surface applicable to the rise levels of the radial strip elements.

The radial strip elements of the first set of strip elements further have rise levels which change along their lengths, have base widths which change along their lengths and, also, have cross-section shapes which include substantially circular sections.

BRIEF DESCRIPTION OF THE DRAWINGS

FIG. 2 is a front elevational view showing the diaphragm of FIG. 1, along with its associated annular suspension construction and annular skirt.

FIG. 4 is a cross-sectional view of a strip element taken along the line 4—4 of FIG. 2.

FIG. 5 is a cross-sectional view of a strip element taken along the line 5—5 of FIG. 2.

DETAILED DESCRIPTION

Referring, first, to FIG. 2, there is shown an acoustic diaphragm 12 along with its suspension or surround 14 and mounting skirt 16. The diaphragm, surround and mounting skirt are a single piece of thin metallic sheet material, advantageously and conveniently made of titanium metal.

The form of the suspension 14, which essentially folds and unfolds as the diaphragm moves back and forth, and of the skirt, are well known and do not form a part of the present invention.

Figure 1:
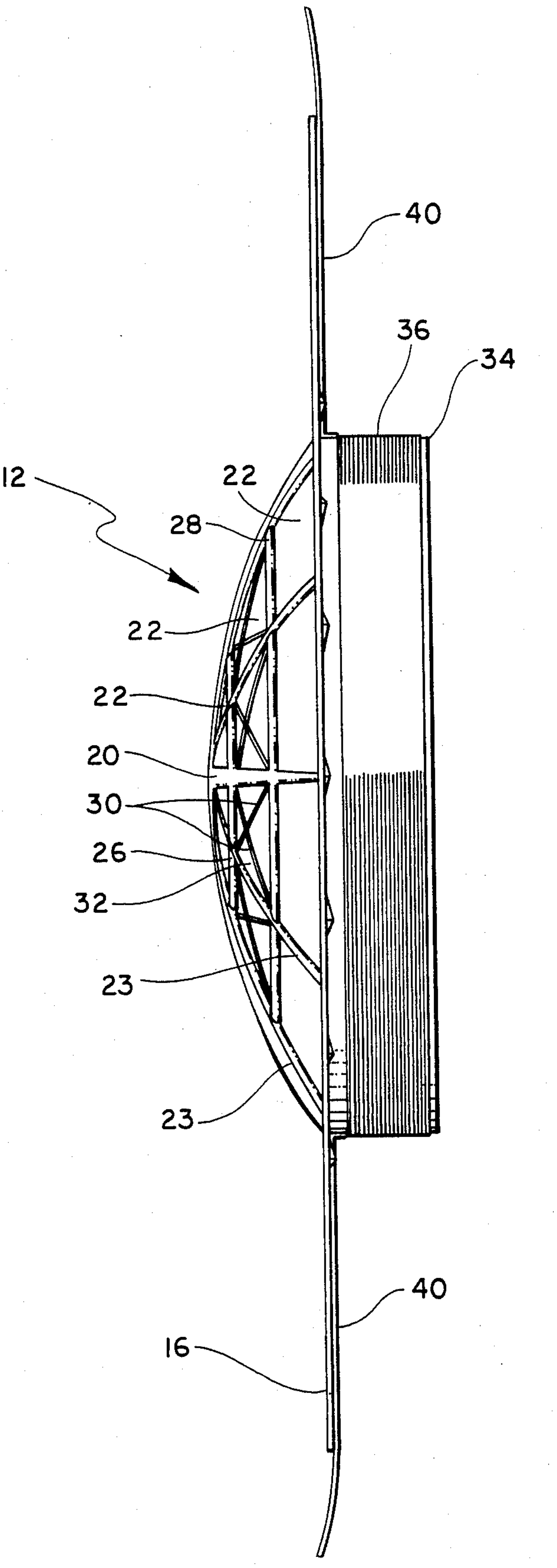
FIG. 1 is a side elevational view showing a diaphragm in accordance with the invention joined with a voice coil assembly.

The diaphragm 12 incorporates a raised pattern 20 of the sheet material and unraised sectors 22 generally between the elements of the raised pattern (FIG. 1).

The diaphragm is of the dome-shaped variety—i.e., it generally follows the shape of a spherical surface. In the embodiment shown, there are ten radial strip elements 23 in the raised pattern (FIG. 1) having arcs of 36° therebetween, as represented by the arc 24 shown in FIG. 2. The raised pattern also incorporates an inner circumferential strip element 26 and an outer circumferential strip element 28, each intersecting each of the radial strip elements. There is, then, also, a set of cross-strip elements 30. There are a total of twenty such cross-strip elements consisting of ten pairs. The strips of each pair extend across an area 32 between adjacent radial strip elements and between the inner and outer circumferential strip elements 26 and 28; and they intersect one another along such area.

Figure 3:
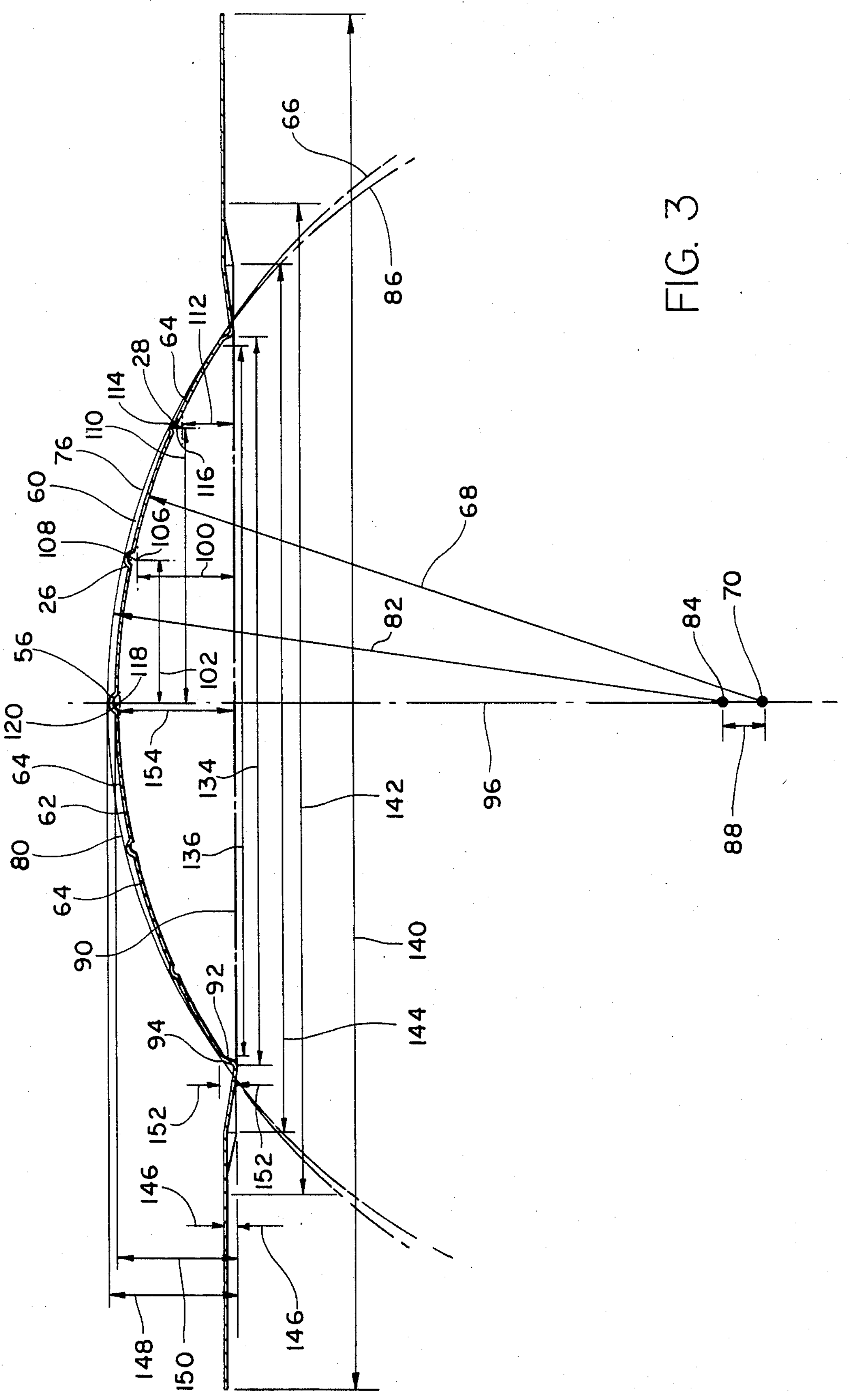
FIG. 3 is a cross-sectional view taken along the line 3—3 of FIG. 2, shown somewhat schematically for purposes of clarity.

FIGS. 3-5 reveal some additional features of the diaphragm and its raised pattern. However, before turning to a consideration of the diaphragm and its raised pattern in additional detail, it will be useful to additionally refer to the general accompanying context for a diaphragm such as the one shown here, as revealed in FIGS. 1 and 2.

The diaphragm, of course, oscillates, generally in piston-like fashion, in response to electrical signals in order to convert the electrical signals into acoustic signals (sound). In FIG. 1, the diaphragm 12 (with its suspension and skirt) is shown joined, in typical fashion, to a coil form or bobbin 34 on which a voice coil 36, which carries the electrical signal, is wound. The bobbin is adhered to the sheet material of the diaphragm 12, suspension 14 and skirt 16 generally along the circumferential line where the diaphragm and suspension come together. Leads 40 to and from the voice coil, for the voice coil signal, are provided. The skirt 16 typically is used to mount the diaphragm, suspension and skirt in conventional fashion in a frame therefor (not shown).

Of course, in conventional fashion, the whole assembly, including the voice coil, is typically mounted so that the voice coil is immersed in a magnetic field. Then the electrical signals through the voice coil, as a result of the magnetic field, exert forces on the voice coil causing the diaphragm 12 to move back and forth, with the changing signals, generating the acoustic (sound) waves.

The suspension 14 expands and contracts (by folding and unfolding) in order to accommodate the movement of the diaphragm. The suspension shown is of the type described in U.S. Pat. No. 4,324,312, issued Apr. 13, 1982, titled Diaphragm Suspension Construction. The suspension has pyramid-like structures 46 therealong (here twenty in number to go with the ten radial strip elements), as described in such patent. The lines along the suspension, shown in FIG. 2, are the fold lines for the suspension structure. As described in such patent, the pyramid-like structures rise above and below a suspension plane defined, with the suspension in its quiescent, folded position, by an inner 48 and an outer 50 circumferential fold line. A central fold line 52, which is also circumferential, rises and falls along the pyramid-like structures. As is apparent and previously indicated, FIG. 2 is drawn to clearly show the suspension fold lines.

It is again emphasized that the particular form of the suspension and of the skirt form no part of the present invention. However, the form of suspension generally has been found to be particularly desirable and advantageous and, as in other contexts, is considered to be desirable and advantageous in the present context.

Referring to FIG. 2, the radial strip elements 23, which, of course, are alike apart from their differing angular positions, extend from the vicinity of the apex 53 of the diaphragm 12. The radial strip elements 23, as is shown, merge together to form a raised central portion 54 in such vicinity of the apex.

FIG. 3 is a generally cross-sectional view taken along the line 3—3 of FIG. 2. However, it is shown somewhat schematically in order to more clearly reveal the form and structure of the diaphragm. Thus, it shows the cross-sectional shape of the "north" radial strip element 56 of FIG. 2, at the apex of the diaphragm, without the remainder of the raised central portion 54 relating to the other strip elements, in order to more clearly reveal the form of the radial strips. It, of course, also shows the inner 26 and outer 28 raised circumferential strip elements, so as to reveal their form and shape. In addition, the drawing clearly shows, as the background for the cross-sectional view, the "east-northeast" 60 and "west-northwest" 62 radial strip elements.

Referring to FIGS. 1, 2 and 3, the unraised sectors 22 of the diaphragm, at their outer surfaces 64, lie along or follow an imaginary spherical envelope surface. The envelope surface, then, of course, coincides with the outer surface of the unraised portions as shown at 64 in FIG. 3. The continuation of such envelope surface is indicated beyond the outer edge of the diaphragm by the unraised sector dash-dot lines 66 of FIG. 3. The radius is indicated by the radial arrow 68 for the unraised sector spherical surface in FIG. 3, and the center for such spherical surface is indicated at 70.

Referring to FIG. 5, the rise level for the raised pattern at a given position is the maximum level, above the immediately surrounding unraised portion, to which the raised pattern rises. Such rise level is illustrated for the north radial strip element 56, at the cross-section taken along the line 5—5 of FIG. 2, in FIG. 5. Specifically, it is represented by radial element rise level arrows 72 in FIG. 5. Thus, the outer surface of the radial strip element, at the position of the cross-section, rises the distance indicated by the arrows above the outer surface of the surrounding unraised sectors.

Similarly, the base width for a part of the raised pattern at a given position is the width across the outer surface of the raised part, at the position, where such surface joins the surrounding unraised sectors. Thus, at the position of the cross-section taken along the line 5—5 of FIG. 2, the base width for the north radial strip element is indicated by the radial element base width arrows 74 of FIG. 5.

Referring to FIGS. 2, 3 and 5, it is apparent from such figures, that the rise level along each of the like radial strip elements decreases as the strip element approaches the circumferential edge of the diaphragm, at which point the element essentially ends, thus returning to the unraised sector level. As is apparent by reference to these figures, particularly FIG. 3, the levels to which the radial strip elements rise, are also defined by an imaginary spherical envelope surface. Such envelope coincides with and is indicated by the top lines 76 and 80 for the east-northeast 60 and west-northwest 62 radial strip elements in FIG. 3. The radius for this spherical surface is indicated by the radial arrow 82 for the radial element rise level spherical surface, in FIG. 3. The center, then, is indicated at 84. The continuation of this spherical surface beyond the outer edges of the diaphragm is represented by the raised spherical surface dash-dot lines 86 in FIG. 3.

Beyond the fact that the radii for the unraised and raised spherical surfaces are different, their centers, although of course positioned along the same line (vertically down from the apex in FIG. 3), are also at different points. The distance between the centers is represented by the center point arrow 88 in FIG. 3.

The shape and size for the cross-sections of the inner 26 and outer 28 circumferential strip elements, as well as for the radial strip elements, along their lengths, are defined by geometrical circular techniques which can be readily described in connection with FIGS. 2, 3 and 5.

Before proceeding with this, it should briefly be noted that the base plane and base level for the diaphragm 12 in FIG. 3, is represented by the base plane dash-dot line 90. There is then a short vertically-extending (by reference to the view of FIG. 3) portion of the diaphragm at 92, and also a short transition portion at 94 which serves as the transition from the vertical portion to the onset of the generally spherical shape for the diaphragm.

Now returning to such cross-section shapes and sizes and referring in more detail to FIG. 3, there is a center relating to the inner circumferential strip element 26 at each position along the length of such element. Such center is for an inner circumferential element circle which serves to define the cross-sectional shape and size of the element. The center is located a set vertical distance above the base plane for the diaphragm (represented by the base plane dash-dot line 90), and a fixed horizontal distance from the applicable center plane for the diaphragm, represented for the cross-section of FIG. 3 by the center plane dash-dot line 96. The vertical distance for the circle center applicable to the cross-section of FIG. 3 is represented by the vertical inner circumferential element arrows 100 in FIG. 3; the horizontal distance is represented by the horizontal inner circumferential element arrows 102; and the center for the inner circumferential element circle, in FIG. 3, is at 106.

Now, specifically, the shape and size (the contour of the outer surface) for the inner circumferential strip element at the cross-sections along its length, such as the cross-section of FIG. 3, is along a circle from the indicated center having a set radius, indicated by the radial arrow 108 for the inner circumferential element circle, as shown in FIG. 3. The base width for the element is then determined by the intersection of the indicated circle with the upper surfaces of the adjacent unraised sectors of the diaphragm. (The base width, thus, of course, is defined analogously to the base width for the radial strip elements as discussed in connection with FIG. 5.) As indicated here and in the drawings, the cross-section shape and size does not vary along this strip element (except at intersections with the radial strip elements where the defined cross-sections for the intersecting strips in effect merge together).

The determination of the shape and size for the outer circumferential strip element 28 is analogous to that for the inner circumferential strip element, as just explained. Of course, the horizontal and vertical distances for the applicable circle will differ; also, the radius for the applicable circle may differ. Referring to the cross-section of FIG. 3, the horizontal distance for the outer circumferential circle center is indicated by the horizontal outer circumferential element arrows 110; the vertical distance is indicated by the vertical outer circumferential element arrows 112; the center for the outer circumferential element circle is at 114; and the radius for the circle is indicated by the radial arrow for the outer circumferential circle at 116.

Now referring to the radial strip elements, their shape and size at various positions along their lengths is determined in a somewhat related, but different fashion.

With respect to the radial strip elements, the cross-sectional shape and size (along the outer surface of the element) also is determined by a circle drawn about a center and by where that circle joins the unraised sector level. The radius for the circle is independent of the position. Thus, by reference to the radial element circle center 118 of FIG. 3, one can see this radius indicated by the radial arrow 120 for the radial element circle. As just noted, such radius (its length) remains the same at the various positions moving down a radial strip element. However, the center position for such radius, at the various positions, is determined in a particular way which is apparent by reference to FIG. 3.

Specifically, such center, at a given position, is the distance below the radial element rise level spherical envelope, along the radius for such envelope, which is equal to the radius for the radial strip element circle. For example, in FIG. 3, the cross-section for the "north" radial strip element 56 is shown at the apex of the diaphragm, for purposes of clarity as if the other radial elements did not merge with such cross-section at the apex. Thus, at that point, the center for the circle is determined by moving the radial arrow 82 for the radial element rise level spherical surface to the apex and by moving downward from the tip of such arrow a distance equal to the radial arrow 120 for the radial element circle—i.e., to the radial element circle center 118 of FIG. 3. Similarly, at a position much further down along the north radial strip element 56, the position of FIG. 5, the center for the applicable radial element circle, shown at 124, is similarly determined. Specifically, the arrow 82 for the radial element rise level spherical surface is rotated to that position, and the center is determined by moving downward from the tip of that arrow, along the arrow, a distance equal to the radial arrow 126 for the radial strip element circle at that point—i.e., the very same distance as at the apex, as represented in and just explained with reference to FIG. 3. Thus, as indicated, the length of the radial arrow 126, at the lower level of FIG. 5, is the same as the comparable radial arrow 120 shown at the apex in FIG. 3.

Of course, as previously explained, the rise level does change along the radial strip element and the base width also changes, both decreasing toward the outer edge of the diaphragm. Such decrease in rise level and decrease in base width, are, of course, defined by the geometric factors which have been explained and, in this connection, are well evident in the drawings.

The cross-section shape and size along the cross-strip elements 30 is substantially uniform, as illustrated in FIG. 4 (except at intersections with one another where the cross-sections for such strips effectively merge together). Such shape and size is determined by a circle (to the outer surface of the element) centered essentially at the level of the surrounding unraised sectors of the diaphragm. Thus, by reference to FIG. 4, a cross-element circle center is shown at 128 and a radial arrow 130 for the center and associated circle is shown.

The diaphragm 12 (together with the integral suspension 14 and skirt 16) are advantageously and conveniently made of 0.001 inch (0.02540 millimeter) thick titanium. Such thickness is advantageous and convenient with respect to the competing goals of strength and lightness. For a size applicable to a voice coil of about 1 inch (2.540 centimeters) in diameter, the integral structure is particularly adapted for cold-forming in a die. The structure, also, is particularly adapted for that size range, and the following is a list of various specific pertinent dimensional information for an embodiment of the indicated size range:

| | |
|---|---|
| the radius for the unraised sector spherical surface envelope | 0.920 inch (2.337 cm) |
| the radius for the radial element rise level spherical surface envelope | 0.8694 inch (2.208 cm) |
| the distance between the two centers for such spherical surface envelopes | 0.0607 inch (1.542 mm) |
| the radius for the radial element circle | 0.015 inch (0.381 mm) |
| the radius for the inner circumferential element circle | 0.0165 inch (0.419 mm) |
| the radius for the outer circumferential element circle | 0.0165 inch (0.419 mm) |
| "vertical" position (above base plane) of center for inner circumferential element circle | 0.1345 inch (3.416 mm) |
| "horizontal" position (from center plane) of center for inner circumferential element circle | 0.1875 inch (4.763 mm) |
| "vertical" position (above base plane) of center for outer circumferential element circle | 0.0705 inch (1.791 mm) |
| "horizontal" position (from center plane) of center for outer circumferential element circle | 0.375 inch (9.525 mm) |
| diameter for base of diaphragm - i.e., for circular base at base plane where diaphragm and suspension meet (represented by base diameter arrows 134 in FIG. 3) | 1.005 inch (2.553 cm) |
| comparable diameter to that immediately above, but measured above the base plane at the onset of the short transition portion leading into the short vertical portion near the outer edge of the diaphragm (represented by the diameter dimension at transition onset arrows 136 in FIG. 3) | 0.9840 inch (2.499 cm) |
| diameter dimension for the total structure - i.e., to outer edge of skirt (represented by the overall diameter dimension arrows 140 in FIG. 3) | 1.900 inches (4.826 cm) |
| diameter dimension to outer edge of suspension (represented by the outer suspension diameter arrows 142 in FIG. 3) | 1.370 inches (3.480 cm) |
| diameter dimension to middle of suspension (represented by the mid-suspension diameter arrows 144 in FIG. 3) | 1.200 inches (3.048 cm) |
| height of skirt above base plane (represented by the skirt height arrows 146 in FIG. 3) | 0.015 inch (0.381 mm) |
| height of raised pattern above base plane at apex (represented by the apex raised pattern arrows 148 in FIG. 3) | 0.1736 inch (4.409 mm) |
| unraised sector height above base plane applicable at apex (represented by the apex unraised sector arrows 150 in FIG. 3) | 0.1636 inch (4.155 mm) |
| height for short vertical portion and short transition portion of diaphragm above base plane (represented by the vertical and transition portion arrows 152 in FIG. 3) | 0.021 inch (.533 mm) |
| height above base plane for radial element cross-section circle at apex (represented by the radial element apex cross-section circle arrows 154 in FIG. 3) | 0.1586 inch (4.028 mm) |

The diaphragm, as described in detail herein, for use as a direct radiator—i.e., a radiator providing waves which directly emanate into the surrounding space—is adapted for what is generally considered the upper audio range—from about 5 kilohertz to 20 kilohertz. For use as a compression driver—i.e., to send sound waves against a close facing surface and compress the waves between the surface and diaphragm before they emanate into the surrounding space—it is adapted to have a range from about 2 to 3 kilohertz to 20 kilohertz. Thus, the diaphragm is adapted to well satisfy the needs of high frequency speakers—i.e., "tweeters", generally considered to cover the range from about 5 kilohertz through 20 kilohertz.

By way of example, a variation on the design described in detail herein, not considered to be as favorable as such design, well satisfies the characteristics just noted. Such variation has eight radial strip elements (which are thus 45° apart) with the concomitant lesser number of, but larger, unraised sector divisions. Further, such variation does not incorporate the desirable lowering of the rise level for the radial strip elements in the direction from the apex toward the outer edge of the diaphragm, nor the decrease in the base width for such strip elements in that direction. Thus, according to that form, the centers for the unraised sector spherical surface envelope and for the radial element rise level spherical surface envelope are at the same point. Thus, a uniform separation for such envelopes, then, resides solely in the difference in the lengths of their radii of, e.g., in the range of 0.015 inch (0.381 mm). In this connection, roll-off does not occur in any form raising a concern below the 20 kilohertz upper audio frequency limit and "chirping", which might typically be expected to begin to arise at about the 5 to 7 kilohertz range for smooth dome-shaped metallic diaphragms of comparable size, also does not appear to be present in any form raising practical concern.

The approach and form described herein is considered to be particularly applicable to diaphragms which are smaller than low frequency diaphragms. In the form of domes, such low frequency diaphragms generally have base diameters of in the general ranqe of 12 to 30 inches (30.5 to 76.2 cm). In the form of cones, the same range generally applies, for the diameter of the base of the cone or of the larger base of the cone where the apex of the cone is cut off (usually measured to the outer surface when the thickness of the diaphragm is significant).

Mid-range diaphragms typically are considered to have such base diameters, in the range of about 5 to 10 inches (12.7 cm to 25.4 cm). Similarly, the high frequency diaphragms generally have such base diameters, in the range of about 4 to 5 inches (10.2 cm to 12.7 cm) or less.

In adapting the approach as described herein to a larger high frequency diaphragm, by way of example, a dome-shaped diaphragm having approximately a 4-inch (10.2 cm) base diameter, a number of considerations are apparent.

First, by way of further background, the radius for the general spherical shape for such a diaphragm might typically be in the range of about 3 inches (37.6 cm), and the height from the base to the top might typically be in the range of about 0.7 inch (1.8 cm).

Second, in keeping with the 2-to-1 ratio of radial strip elements to pyramid-like elements for the particular form of suspension, a choice of thirty-six radial strip elements might typically be expected for the "4-inch" size.

Third, to increase stiffness, a rise level for the radial strip elements (at the apex) of in the range of three times that for the size described in detail herein—i.e., of about 0.045 to 0.50 inch (1.1 cm to 1.3 cm) might be typical. However, with such larger size, radial elements which initially rise with straight sides and form the circular cross-sectional shape on top of such sides could be advantageous and convenient. Similarly, the height for the cross-elements might typically be in the range of three times as great—i.e., in the range of about 0.015 inches (0.381 mm) with, however, the straight walls topped by a circular cross-sectional shape perhaps also advantageous and convenient here.

Because a larger number of radial strip elements and of cross-elements would apply to the larger size, increased base widths typically might well not be called for. Similarly, to follow the same basic configuration, additional circumferential strip elements would be called for. However, additional height and/or width for such elements may not necessarily be desirable, with the role of such elements being to provide anchor or cross-points for the radial strip elements and cross-strip elements more than to contribute to stiffness.

As a final matter, it will be apparent to those skilled in the art that a variety of changes and modifications in the diaphragm device form, as described in detail herein, may be adopted without departing from the spirit or scope of the invention.

What is claimed is:

1. An acoustic diaphragm, comprising:

metallic sheet material having a raised pattern formed thereon;

said raised pattern including a plurality of first raised strip elements extending radially from a point on said matallic sheet material and a plurality of second raised strip elements;

said second raised strip elements including a plurality of pairs of intersecting strip elements, each of said intersecting pairs being positioned between adjacent first raised strip elements.

2. An acoustic diaphragm as defined in claim 1 wherein said sheet material has substantially a dome shape.

3. An acoustic diaphragm as defined in claim 1 wherein said sheet material is shaped to have an apex and wherein said first raised strip elements extend radially from the vicinity of said apex.

4. An acoustic diaphragm as defined in claim 1 wherein said raised pattern further comprises a plurality of third raised strip elements, said third raised strip elements extending circumferentially about said metallic sheet material and intersecting said first raised strip elements.

5. An acoustic diaphragm as defined in claim 1 wherein said metallic sheet material defines a surface and said first raised strip elements have a length extending along said surface, and wherein said first raised strip elements have rise levels extending above said surfaces which vary along said length of said first raised strip elements.

6. An acoustic diaphragm as defined in claim 1 wherein said first raised strip elements extend along a length of said material and have base widths which vary along said length.

7. An acoustic diaphragm as defined in claim 1 wherein said first raised strip elements are substantially semi-circular in cross-section.

8. An acoustic diaphragm as defined in claim 1 wherein said metallic sheet material defines a surface and said first raised strip elements have rise levels extending above said surface, said rise levels being substantially defined by an imaginary envelope having the shape of a section of a spherical surface.

9. An acoustic diaphragm as defined in claim 1 wherein said sheet material defines a substantially a dome-shaped surface, and wherein said first raised strip elements have rise levels extending above said surface which substantially define an imaginary envelope having the shape of a section of a spherical surface.

10. An acoustic diaphragm as defined in claim 9 wherein said spherical surfaces have different centers.

11. An acoustic diaphragm, comprising:

metallic sheet material having a raised pattern formed thereon;

said raised pattern including a plurality of first raised strip elements extending radially from a point on said metallic sheet material and a plurality of second raised strip elements interposed between adjacent ones of said first raised strip elements and extending at an angle with respect to said first raised strip elements.

12. An acoustic diaphragm as defined in claim 11 wherein said second raised strip elements are substantially straight.

13. An acoustic diaphragm as defined in claim 11 wherein said sheet material has substantially a dome shape.

14. An acoustic diaphragm as defined in claim 11 wherein said sheet material has an apex.

15. An acoustic diaphragm as defined in claim 14 wherein said first raised strip elements extend radially from the vicinity of said apex.

16. An acoustic diaphragm, comprising:

metallic sheet material having a raised pattern formed thereon;

said raised pattern including a plurality of first raised strip elements extending radially from a point on said metallic sheet material and at least two second raised strip elements extending circumferentially about said metallic sheet material and intersecting said first raised strip elements.

17. An acoustic diaphragm as defined in claim 16 wherein said raised pattern further comprises a plurality of third raised strip elements interposed between ones of said first raised strip elements.

18. An acoustic diaphragm as defined in claim 16 wherein said sheet material has substantially a dome shape.

19. An acoustic diaphragm as defined in claim 16 wherein said sheet material has an apex.

20. An acoustic diaphragm as defined in claim 19 wherein said first raised strip elements extend radially from the vicinity of said apex.

21. An acoustic diaphragm, comprising:

sheet material formed into an arcuate three-dimensional surface having a substantially round base, said surface having a raised pattern formed thereon and said base having a maximum dimension of not greater than approximately ten inches;

said raised pattern including plurality of first raised strip elements extending radially from a point on said sheet material and second raised strip elements interposed between adjacent ones of said first raised strip elements and extending at an angle with respect to said first raised strip elements.

22. An acoustic diaphragm as defined in claim 21 wherein said second raised strip elements are substantially straight.

23. An acoustic diaphragm as defined in claim 21 wherein said base is substantially circular and has a diameter not greater than approximately ten inches.

24. An acoustic diaphragm as defined in claim 21 wherein said surface is shaped to have an apex and wherein said first raised strip elements extend radially from the vicinity of said apex.

25. An acoustic diaphragm as defined in claim 21 wherein said first raised strip elements extend along a length of said surface and have rise levels extending above said surface, said rise levels varying along said length.

26. An acoustic diaphragm as defined in claim 21 wherein said surface defines substantially a dome shape, and said first raised strip elements have rise levels extending above said surface substantially defined by an imaginary envelope having the shape of a section of a spherical surface.

* * * * *